(12) United States Patent
Parekh et al.

(10) Patent No.: US 11,543,075 B1
(45) Date of Patent: Jan. 3, 2023

(54) UMBRELLA CLAMP

(71) Applicants: Devang Parekh, Robbinsville, NJ (US); Baburaj Sankaran, Robbinsville, NJ (US); Mario Nagathota, Robbinsville, NJ (US)

(72) Inventors: Devang Parekh, Robbinsville, NJ (US); Baburaj Sankaran, Robbinsville, NJ (US); Mario Nagathota, Robbinsville, NJ (US)

( * ) Notice: Subject to any disclaimer, the term of this patent is extended or adjusted under 35 U.S.C. 154(b) by 0 days.

(21) Appl. No.: 17/493,044

(22) Filed: Oct. 4, 2021

(51) Int. Cl.
*F16M 13/02* (2006.01)
*A45B 23/00* (2006.01)

(52) U.S. Cl.
CPC ........... *F16M 13/022* (2013.01); *A45B 23/00* (2013.01); *A45B 2023/0012* (2013.01)

(58) Field of Classification Search
CPC .................. F16M 13/022; A45B 23/00; A45B 2023/0012
USPC ....................................................... 248/218.4
See application file for complete search history.

(56) References Cited

U.S. PATENT DOCUMENTS

| | | | |
|---|---|---|---|
| 4,832,163 A | 5/1989 | Levesque | |
| 5,255,954 A | 10/1993 | Rogers | |
| 5,478,041 A | 12/1995 | Mayne | |
| 5,836,327 A | 11/1998 | Davis | |
| 7,168,437 B2 | 1/2007 | Bigford | |
| 9,109,616 B1 * | 8/2015 | Ballentine | F16B 7/1454 |
| 9,763,501 B2 | 9/2017 | Supino | |
| 10,633,882 B2 | 4/2020 | North | |
| 10,765,185 B1 | 9/2020 | Wengerd | |
| 10,953,263 B2 * | 3/2021 | Stilson | A63B 21/0724 |
| 11,084,161 B2 * | 8/2021 | Everingham | B25G 1/04 |
| 2009/0189035 A1 * | 7/2009 | Gambill | A45B 23/00 248/218.4 |
| 2013/0161474 A1 * | 6/2013 | May | E02D 27/42 248/530 |
| 2015/0305453 A1 | 10/2015 | Gatto-Weising | |
| 2022/0049805 A1 * | 2/2022 | Hinton | F16L 37/18 |

* cited by examiner

*Primary Examiner* — Muhammad Ijaz
(74) *Attorney, Agent, or Firm* — The Law Firm of P. Jeffrey Martin, LLC; P. Jeff Martin; Matthew R. Gore

(57) ABSTRACT

An umbrella clamp that includes an adjustable, flexibly-resilient clamp having a cam lever, the clamp detachably secured around an umbrella post, the clamp further includes a flange and anchor assembly, and one or more shock absorber elements. The clamp includes a flange with a series of holes, each of the holes are configured for securing one end of a cable, the opposing end of the cable is affixed to a weighted article (such as a bag filled with sand) and one or more friction pads disposed along the inner surface of the clamp body.

17 Claims, 9 Drawing Sheets

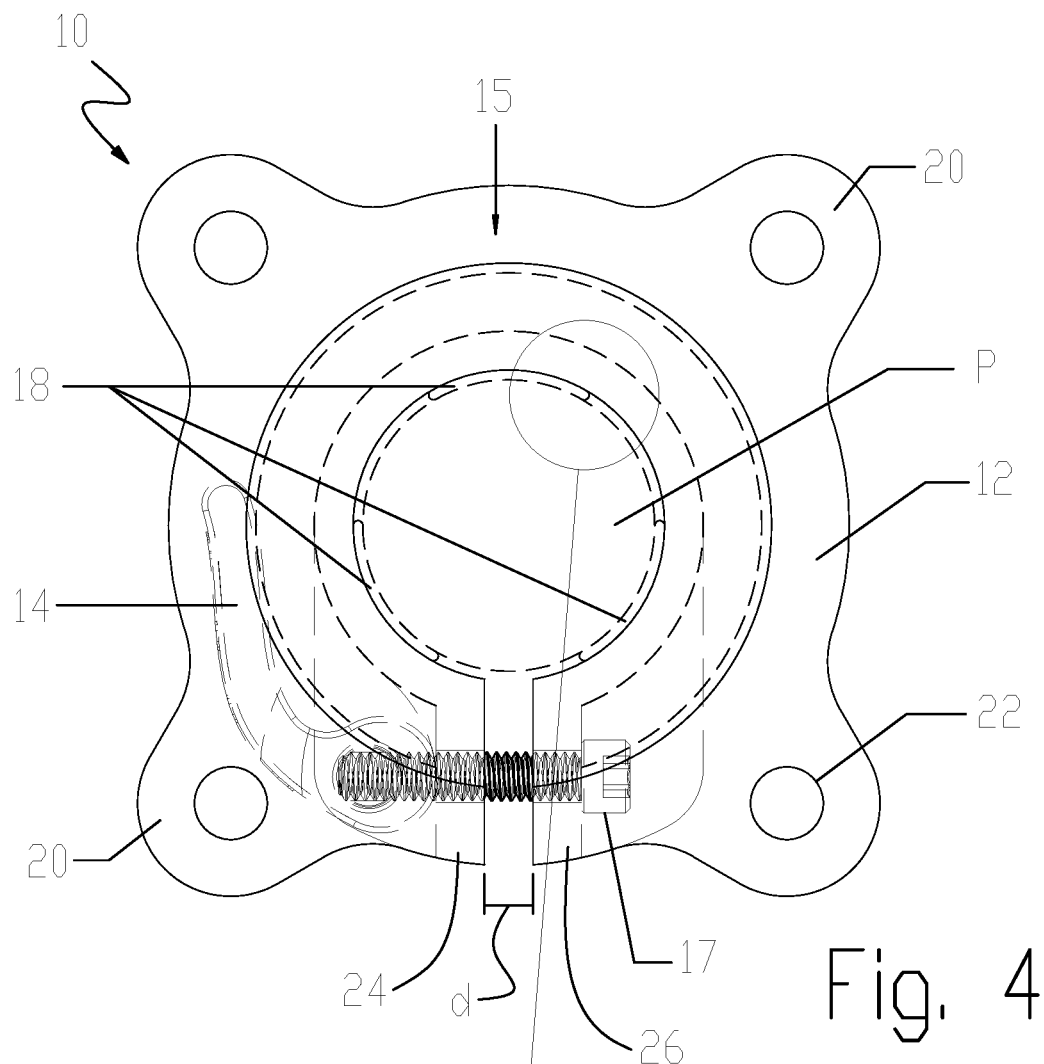
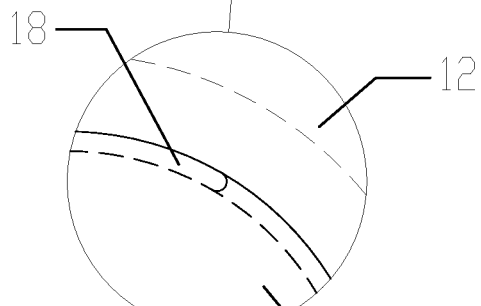
Fig. 4
Fig. 5

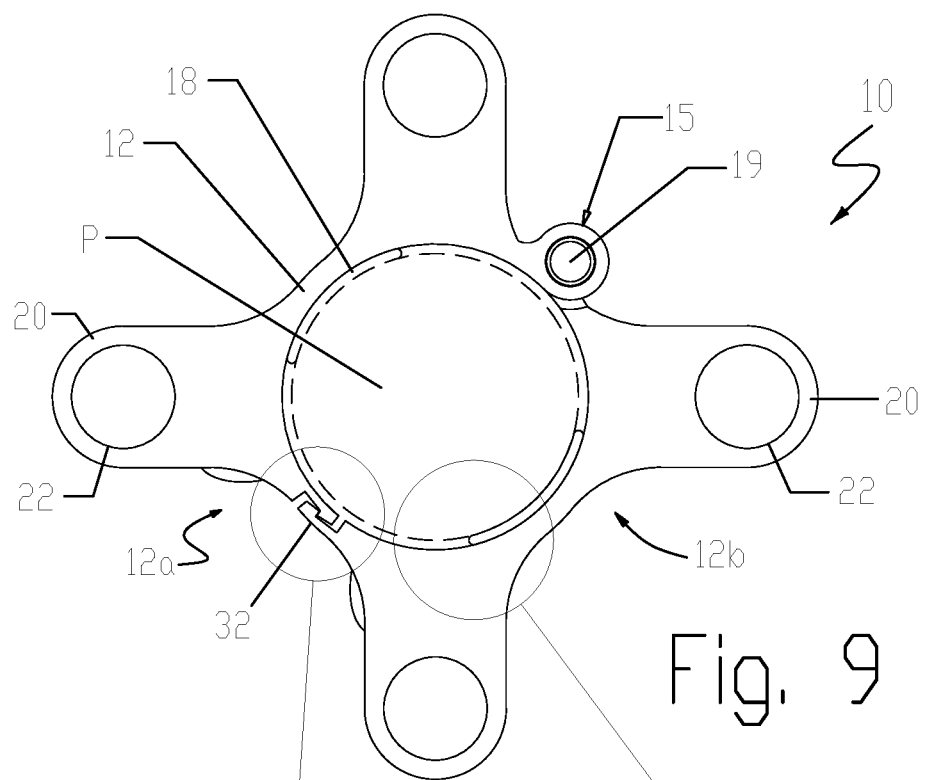
Fig. 9
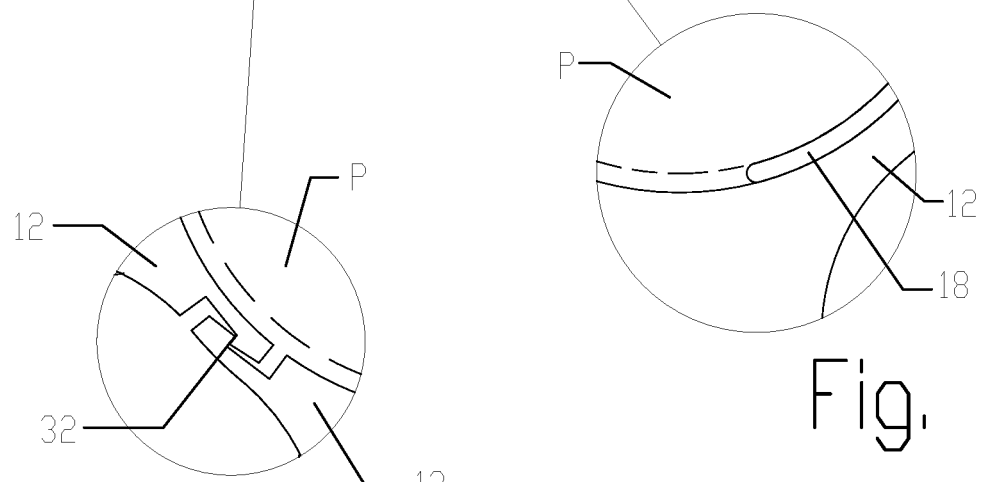
Fig. 11
Fig. 10 excerpt of US 11,543,075 B1

UMBRELLA CLAMP

RELATED APPLICATIONS

There are no previously filed, nor currently any co-pending applications, anywhere in the world.

FIELD OF THE INVENTION

This application discloses claims and embodiments generally related to an umbrella clamp, and more particularly, an umbrella clamp having shock absorbing elements and anchoring assembly.

BACKGROUND OF THE INVENTION

Numerous attempts have been made to improve the stability of sunshades and/or umbrellas. The following is a non-exhaustive description of several patents and/or printed publications discussing the stability of such umbrella devices:

U.S. Pat. No. 7,168,437 B2, issued in the name of Bigford, wherein Bigford discloses a ring having an adjustable inner diameter, by which adjustment may be provided not only via a set screw but also through the use of clamps, and further including the use of a set screw that provides adjustment of the inner diameter of the ring and functions to secure the ring to the umbrella shaft;

U.S. Pat. No. 4,832,163, issued in the name of Levesquea, wherein Levesquea discloses a pair of containers connected using a snap fit, frictionally-engaged connection;

U.S. Pat. No. 5,255,954, issued in the name of Rogers, wherein Rogers discloses a frame and support for attaching and supporting an umbrella on the back portion of a chair, the support including a supporting sleeve which cooperatively receives in telescoping relation the shank of a conventional sun shade umbrella, and wherein the umbrella may be vertically adjusted via a manually moved cam locking lever;

U.S. Pat. No. 9,763,501 B2, issued in the name of Supino, wherein Supino discloses a beach umbrella anchoring system comprising a restraining device or container for preventing the beach umbrella from being blown about by unexpected, sudden gusts of wind comprising a container;

U.S. Pat. No. 5,836,327, issued in the name of Davis, wherein Davis discloses an umbrella holder comprising a clamp mechanism, a right/left angular adjustment mechanism, a forward/rearward angular adjustment mechanism, a length adjustment mechanism, and an umbrella shaft and handle securing mechanism, wherein the clamp mechanism includes an upper and lower jaw member, an upper and lower resilient clamp pad, and a clamp screw mechanism, and each upper and lower jaw member is provided with a clamp channel that is covered with the upper or lower resilient clamp pad, respectively;

U.S. Pat. No. 5,478,041, issued in the name of Mayne, wherein Mayne discloses a clamping and holding device and more particularly to a clamping and holding device which can be attached to articles such as patio chairs to mount a holder for umbrellas and the like in a variety of positions, the device having a first clamping arm and a second clamping arm pivotally connected to one another to engage an article, a holder extending laterally from the first clamping arm is provided to hold a tray, umbrella or the like, and the holder may be locked in a variety of positions;

U.S. Pat. No. 10,633,882 B2, issued in the name of North et al., wherein North et al. discloses a weight system for containing fill material for supporting a free-standing object, comprising a container defining an interior chamber adapted to contain the fill material and a closure system;

U.S. Patent Application No. 2015/0305453 A1, published in the name of Gatto-Weising, wherein Gatto-Weising discloses a clamp which may include two jaw members that can be tightened to engage a ball joint member; and U.S. Pat. No. 10,765,185 B1, issued in the name of Wengerd, wherein Wengerd discloses an umbrella mounting device includes a clamp assembly configured to be removably clamped to an elongated support member and an umbrella holder coupled to the clamp assembly so that the umbrella holder is rotatable about a longitudinal rotation axis that is generally perpendicular to the clamp assembly axis.

Accordingly, a need continues to exist and is recognized for improvements to devices and apparatuses for stabilizing and anchoring sunshades and umbrellas.

This application presents claims and embodiments that fulfill a need or needs not yet satisfied by the products, inventions and methods previously or presently available. In particular, the claims and embodiments disclosed herein describe an apparatus for anchoring an umbrella, the apparatus comprising an adjustable, flexibly-resilient clamp; the clamp includes a collar, a cam lever, and a radial compression adjustment device, wherein the collar having an internal perimeter positioned around and secured to an umbrella post via the cam lever, and wherein the radial compression adjustment device comprises a rotatable fastener threadedly adjustable through the collar and securing the cam lever in position; at least one shock absorbing element disposed along the internal perimeter of the collar; and an anchor assembly formed on the collar, the apparatus providing unanticipated and nonobvious combination of features distinguished from the products, devices, inventions and methods preexisting in the art. The applicant is unaware of any device, apparatus, method, disclosure or reference that discloses the features of the claims and embodiments disclosed herein.

SUMMARY OF THE INVENTION

In one embodiment, an apparatus for anchoring an umbrella, the apparatus comprising an adjustable, flexibly-resilient clamp, the clamp comprises a collar, a cam lever, and a radial compression adjustment device, wherein the collar comprises an internal perimeter that is positioned around and secured to the umbrella post via the cam lever, and wherein the radial compression adjustment device comprises a rotatable fastener threadedly adjustable through the collar and securing the cam lever in position; at least one shock absorbing element disposed along the internal perimeter of the collar; and, an anchor assembly formed on the collar.

In another embodiment, an apparatus for anchoring an umbrella, the apparatus comprising an adjustable, flexibly-resilient clamp, the clamp comprises a collar, a cam lever, and a radial compression adjustment device, wherein the collar comprises an internal perimeter that is positioned around and secured to the umbrella post via the cam lever, and wherein the radial compression adjustment device comprises a rotatable fastener threadedly adjustable through the collar and securing the cam lever in position; at least one shock absorbing element disposed along the internal perimeter of the collar, wherein the at least one shock absorbing element comprises a flexible, resilient planar pad for absorbing and dampening forces imparted by the umbrella post and for improving frictional grip of the collar to the umbrella post; and, an anchor assembly.

In another embodiment, an apparatus for anchoring an umbrella is described, the apparatus comprising an adjustable, flexibly-resilient clamp, the clamp comprises a collar, a cam lever, and a radial compression adjustment device, wherein the collar comprises an internal perimeter that is positioned around and secured to the umbrella post via the cam lever, and wherein the radial compression adjustment device comprises a rotatable fastener threadedly adjustable through the collar and securing the cam lever in position; at least one shock absorbing element disposed along the internal perimeter of the collar, wherein the at least one shock absorbing element comprises a flexible, resilient planar pad for absorbing and dampening forces imparted by the umbrella post and for improving frictional grip of the collar to the umbrella post; and, an anchor assembly comprising a plurality of apertures formed in the collar, the plurality of apertures formed at intervals equidistant relative to the respective plurality of apertures, wherein each aperture receives and retains a guide line coupled with a weighted article.

For each of the aforementioned embodiments, the collar comprises a first edge and a second edge, the rotatable fastener threadedly rotated clockwise to advance the first edge and the second edge into increased proximity and decreasing the diameter of the void, and the rotatable fastener threadedly rotated counterclockwise to withdraw the first edge and the second edge into decreased proximity and increasing the diameter of the void. In another variant of such an embodiment, the collar comprises a first segment and a second segment, the first segment terminating in the first edge, the second segment terminating in the second edge, and the first segment and the second segment mutually coupled at a position approximately opposite the first edge and the second edge. Alternatively, and in another variant of such an embodiment, the collar comprises a first segment and a second segment, the first segment terminating in the first edge, the second segment terminating in the second edge, and the first segment and the second segment mutually coupled via an articulable hinge at a position approximately opposite the first edge and the second edge.

BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

FIG. 4 is a top view of the clamp of FIG. 3;

FIG. 5 is a detailed view of an inset of a shock absorbing element of the clamp of FIG. 4;

FIG. 9 is a top view of the clamp of FIG. 8;

FIG. 10 is a detail view of the shock absorbing element of FIG. 9;

FIG. 11 is a detail view of the connecting mechanism of FIG. 9;

DETAILED DESCRIPTION OF THE EMBODIMENT(S)

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
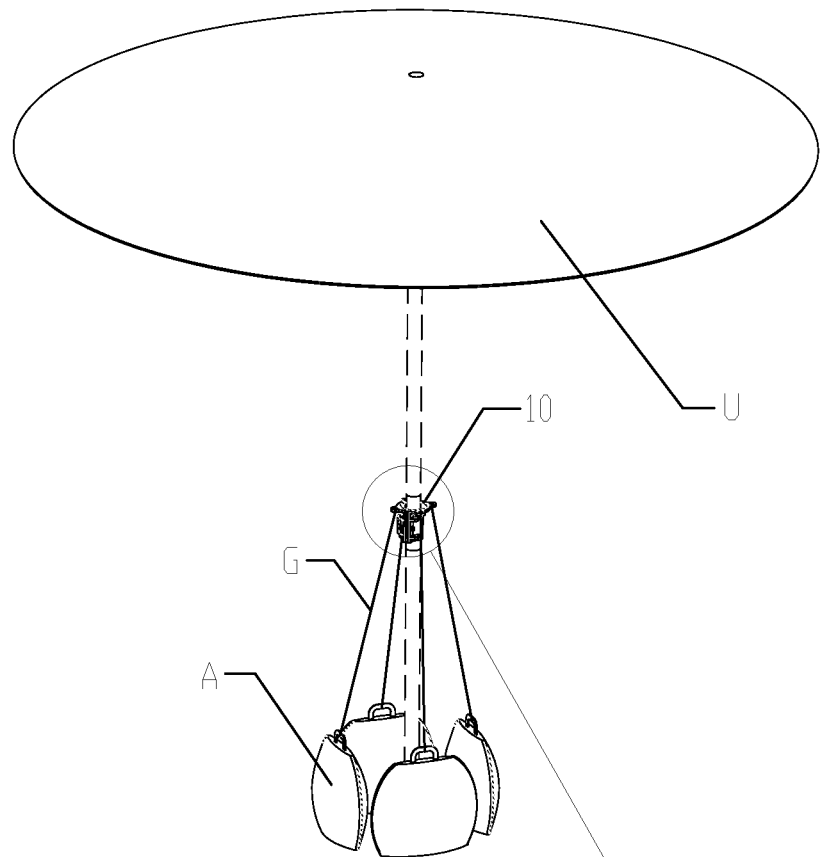
FIG. 1 is a perspective view of the apparatus utilized for umbrella stability.
Figure 2:
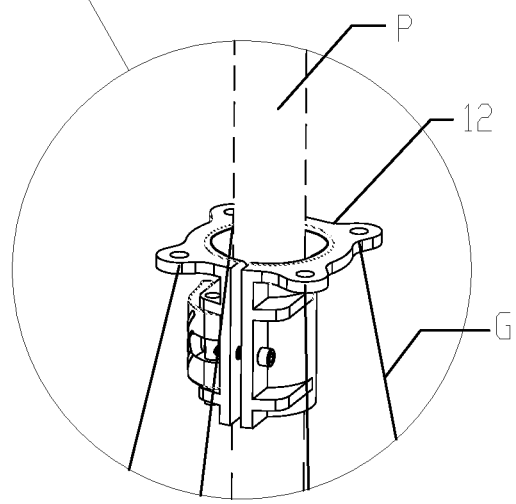
FIG. 2 is a detail view of the clamp of FIG. 1.
Figure 3:
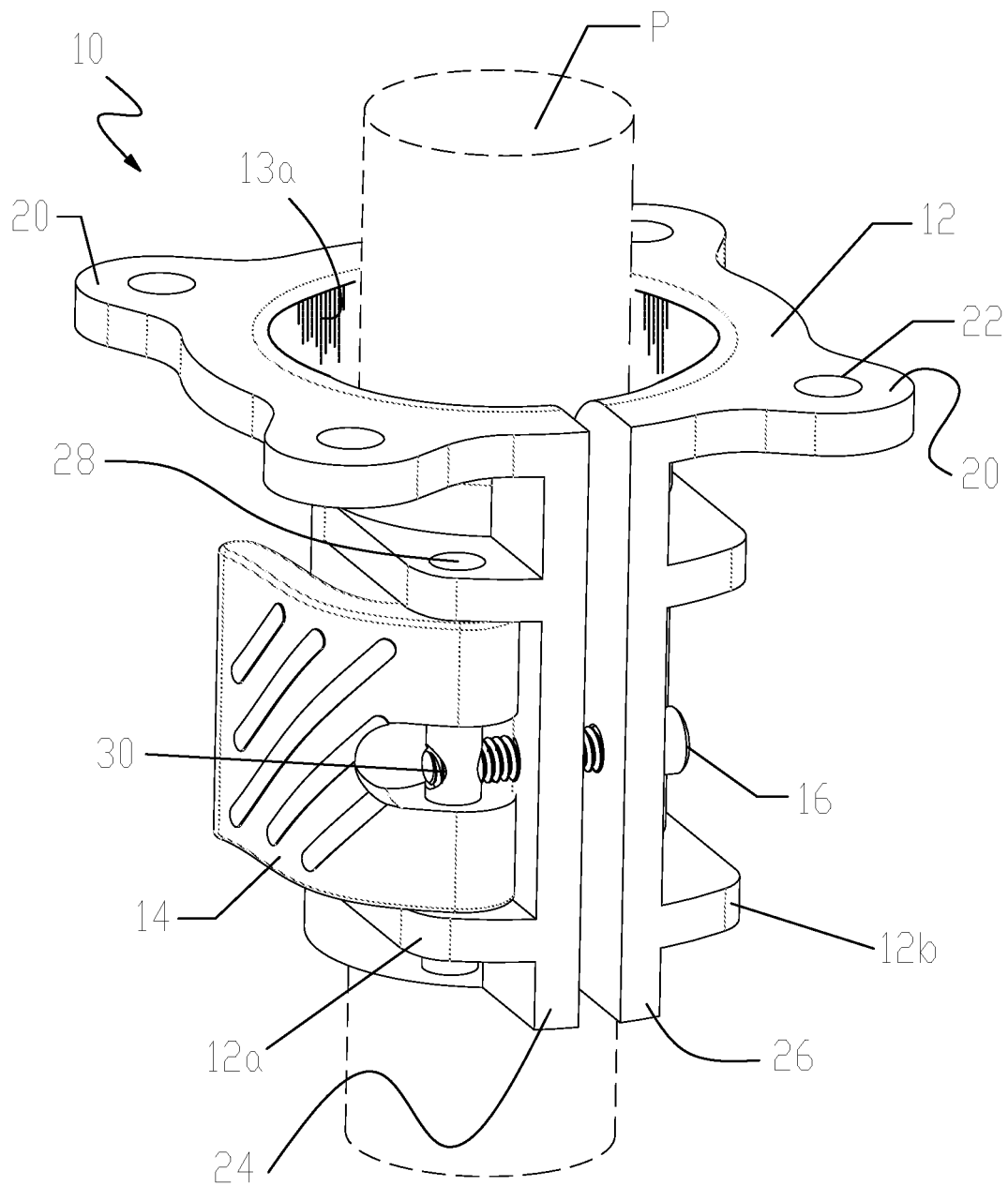
FIG. 3 is a perspective view of one embodiment of the clamp utilized.
Figure 6:
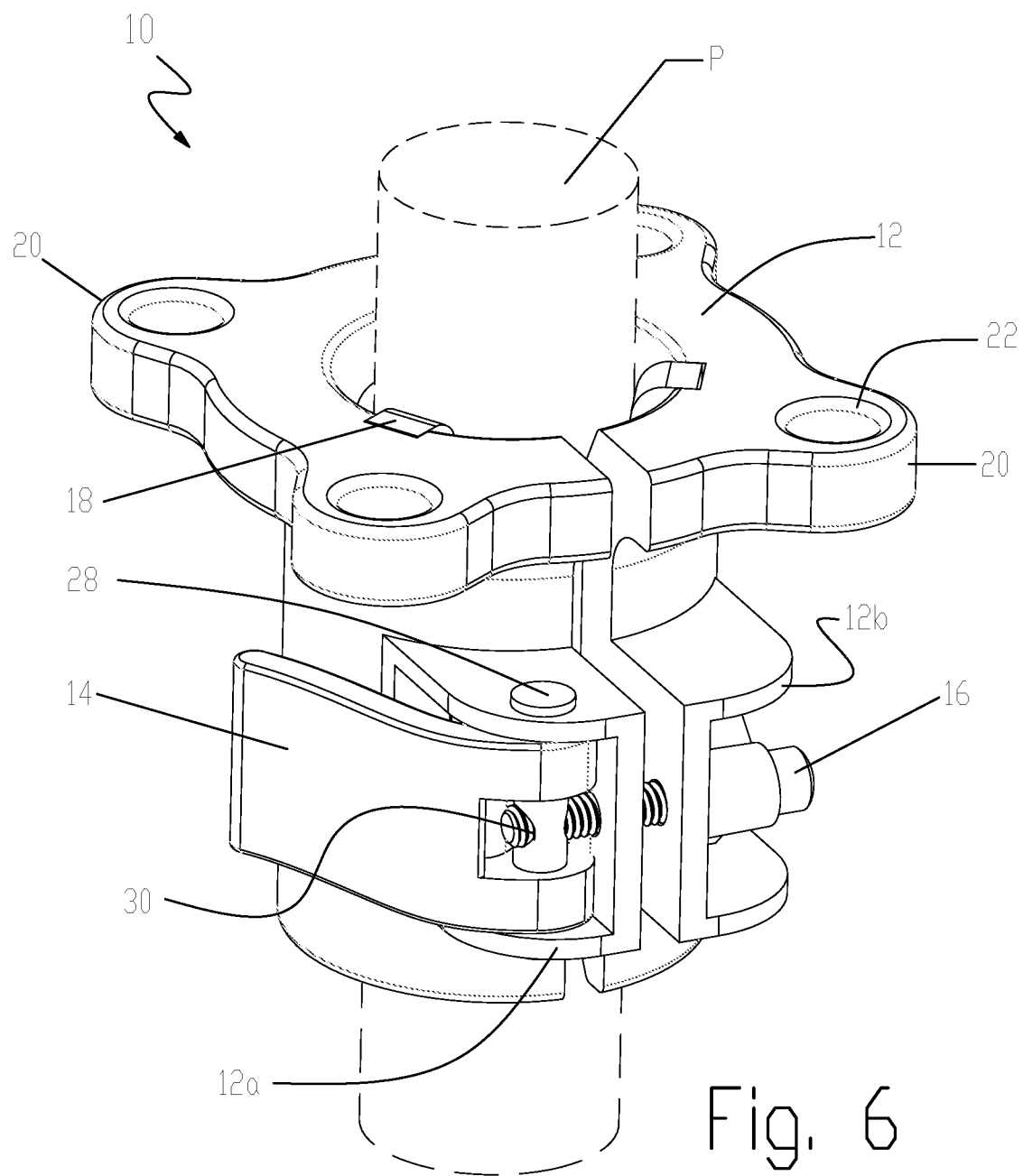
FIG. 6 is a perspective view of an alternative embodiment of the clamp utilized.
Figure 7:
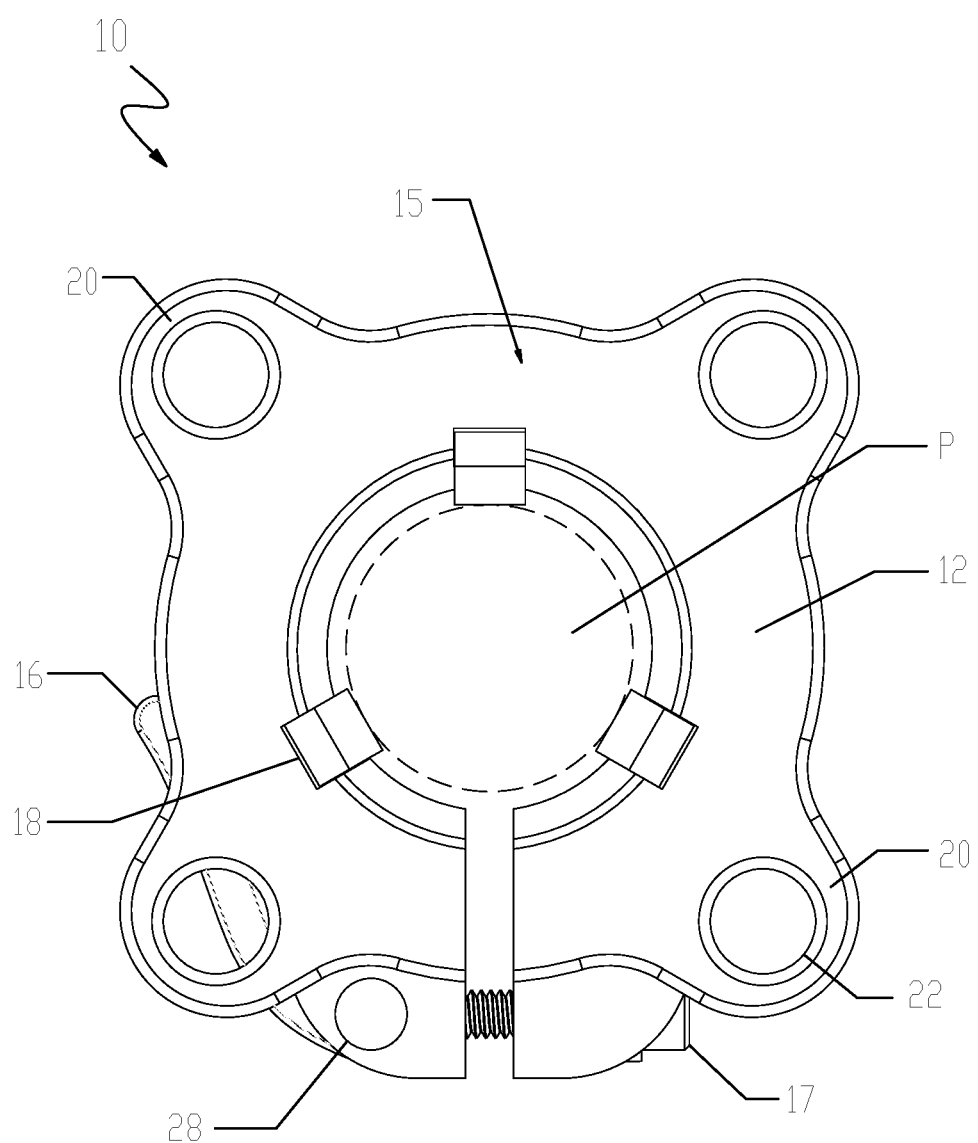
FIG. 7 is a top view of the clamp of FIG. 6.
Figure 8:
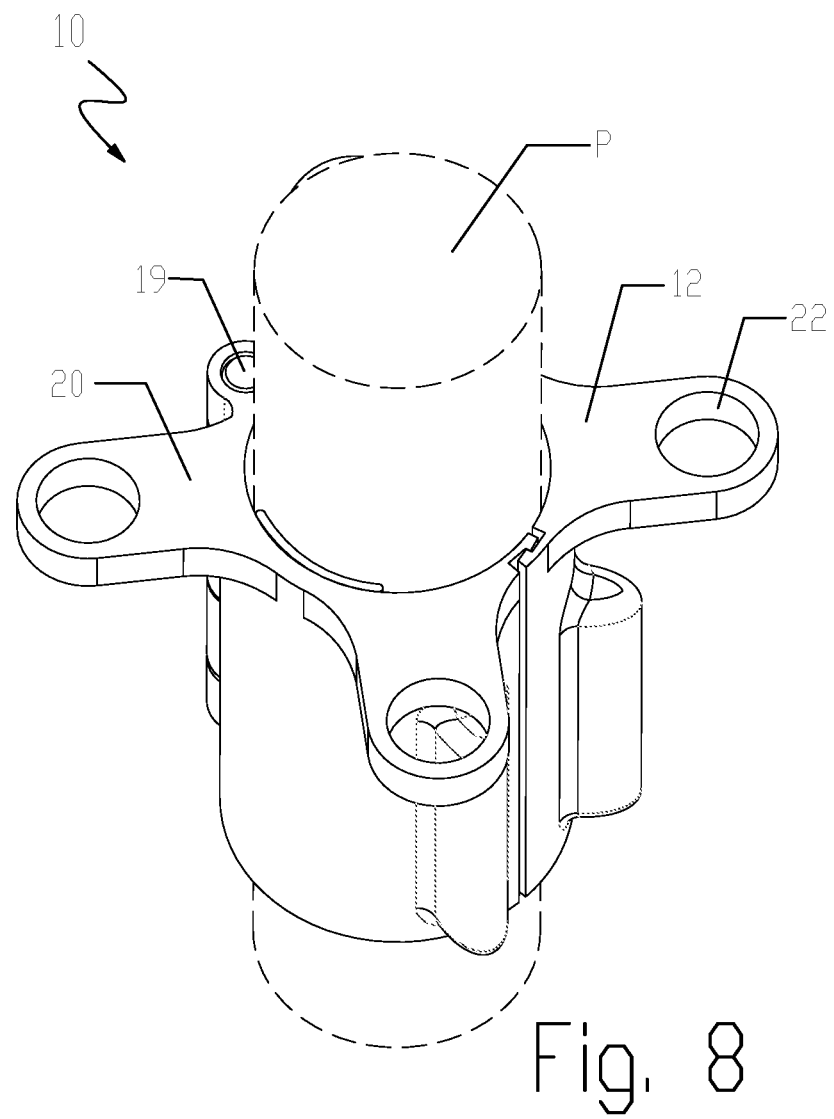
FIG. 8 is a perspective view of an alternative embodiment of the clamp utilized.
Figure 12:
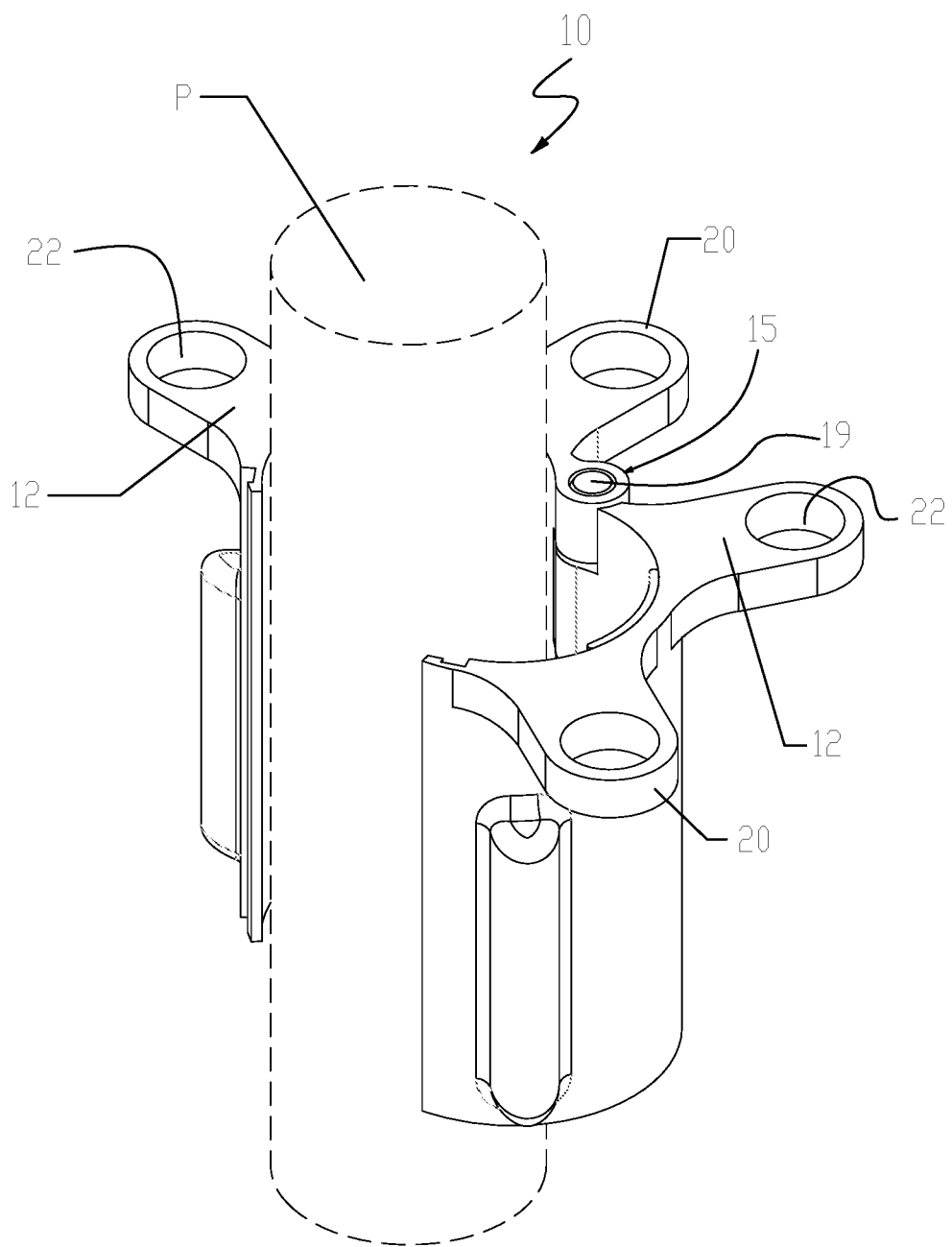
FIG. 12 is a perspective view of an alternative embodiment of the clamp utilized.
Figure 13:
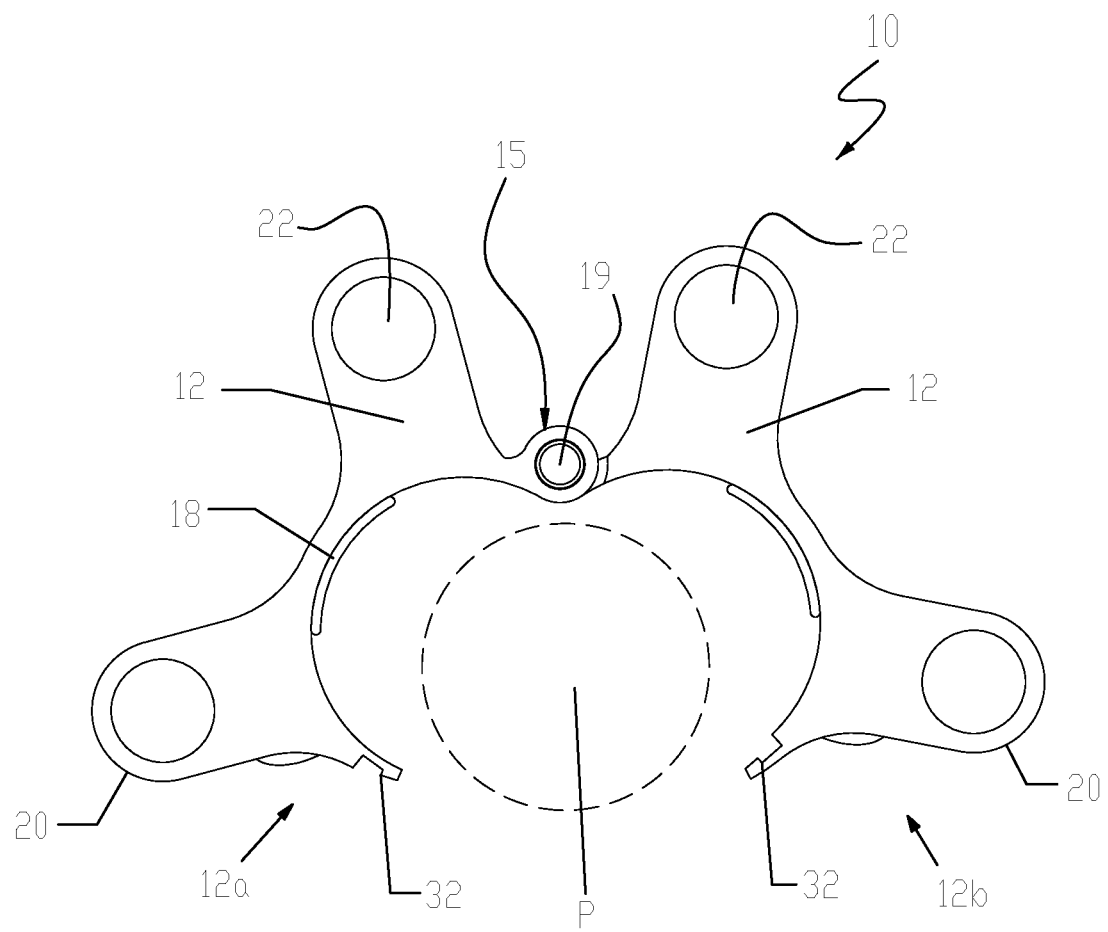
FIG. 13 is a top view of the clamp of FIG. 12.

Consistent with FIGS. 1-13, an umbrella clamp 10 is described and disclosed, the clamp 10 is attached to and detachable from an umbrella post (P) that supports an expanding umbrella canopy (U). More particular, consistent with FIGS. 1 and 2, the clamp 10 when affixed to the umbrella post (P) is additionally assists in maintaining the umbrella assembly (e.g., the post (P) and the canopy (U)) in place via one or more weighted articles (A) secured to the clamp 10 via a guide (G).

Consistent with FIGS. 3, 4, 6, 7, 8, 9, 12, and 13, the clamp 10 comprises an inner void 13b defined by an internal perimeter 13a that complements the external perimeter of the umbrella post (P). It is envisioned that the external perimeter of the umbrella post (P) and the internal perimeter 13a of the void 13b (of clamp 10) are approximately similar dimensions. In such embodiments, the post (P) and internal perimeter 13a and void 13b may comprise a variety of shapes and/or dimensions, including a cylindrical, triangular, orthogonal, or other similarly shaped and dimensioned options.

Consistent with the illustrations, an adjustable, flexibly-resilient clamp 10 is described and disclosed as an apparatus for improving the stability of an umbrella. The clamp 10 comprises a collar 12, a cam lever 14, and a radial compression adjustment device 16, wherein the collar 12 comprises an internal perimeter 13a (defining void 13b) that is positioned around and secured to the umbrella post (P) via the cam lever 14, and wherein the radial compression adjustment device 16 comprises a rotatable fastener 17 threadedly adjustable through the collar 12 and securing the cam lever 14 in position. The clamp 10 also comprises at least one shock absorbing element 18 disposed along the internal perimeter 13a of the collar 12. The clamp 10 also comprises an anchor assembly 20 formed on the collar 12.

As depicted in FIGS. 3, 4, 6, and 7, the cam lever 14 may have a variety of configurations and arrangements. In particular, the lever 14 is articulated between an opened position and closed position (with the closed position generally depicted in the identified illustrations). In the opened position, tension and friction is removed from the clamp 10 and the elements of the clamp 10 (such as the internal perimeter 13a, the void 13b defined by the perimeter 13a, the shock absorbing element(s) 18, and a first segment 12a and a second segment 12b, respectively. In the closed position, tension and friction is applied to bring the clamp 10 and its elements into mechanical communication with the umbrella post (P), securing the clamp 10 to the umbrella post (P) and allowing the fastener 17 to be threadedly advanced to secure the lever 14 of the clamp 10 into place and prevent excessive movement. The lever 14 may include a barrel-shaped axle 28 about which the lever 14 articulates, and through which a threaded bore 30 transversely defined through axle 28 may be positioned to receive and retain the threaded fastener 17.

In reference to FIGS. 8, 9, and 11-13, a connector 32 is provided as an alternative to the lever 14 and radial compression adjustment device 16. The connector 32 may comprise a variety of elements and/or configurations. In but one embodiment, the connector 32 comprises an impingement mechanism that locks the connector 32 until released.

In one embodiment, and consistent with FIGS. 2-4, 6-9, 12, and 13, the collar 12 comprises at least one aperture 22. More preferably, the collar 12 comprises a plurality of apertures 22. Most preferably, the collar 12 comprises a plurality of apertures 22 disposed approximately equidistant from one another. In the example illustrations, the plurality of apertures 22 are four apertures 22 formed in the collar 12 at approximately 90 degree intervals.

More particularly, the collar 12 comprises a first edge 24 and a second edge 26. The rotatable fastener 17 threadedly rotated clockwise to advance the first edge 24 and the second edge into increased proximity (reducing the distance or interval between edges 24, 26 as denoted by d in FIG. 4) and decreasing the diameter of the void 13b. The rotatable fastener 17 threadedly rotated counterclockwise to withdraw the first edge 24 and the second edge 26 into decreased proximity (decreasing the distance or interval between edges 24, 26 as denoted by d in FIG. 4) and increasing the diameter of the void.

In another variant of such an embodiment, the collar 12 comprises a first segment 12a and a second segment 12b, the first segment 12a terminating in the first edge 24, the second segment 12b terminating in the second edge 26, and the first segment 12a and the second segment 12b mutually coupled at a position 15 approximately opposite the first edge 24 and the second edge 26.

Alternatively, and in another variant of such an embodiment, the collar 12 comprises a first segment 12a and a second segment 12b, the first segment 12a terminating in the first edge 24, the second segment 12b terminating in the second edge 26. The first segment 12a and the second segment 12b mutually coupled via an articulable hinge 19 at a position 15 approximately opposite the first edge 24 and the second edge 26, as best depicted in FIG. 9.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. An apparatus for anchoring an umbrella, the apparatus comprising:
   an adjustable, flexibly-resilient clamp, the clamp comprises a collar, a cam lever, and a radial compression adjustment device, wherein the collar comprises an internal perimeter, the internal perimeter of the collar positioned around and secured to an umbrella post via the cam lever, and wherein the radial compression adjustment device comprises a rotatable fastener threadedly adjustable through the collar and securing the cam lever in position;
   at least one shock absorbing element disposed along the internal perimeter of the collar; and
   an anchor assembly formed on the collar.

2. The apparatus of claim 1, wherein the anchor assembly comprises at least one aperture formed through the collar, and wherein the aperture receives and retains a guide line coupled with a weighted article.

3. The apparatus of claim 2, wherein the internal perimeter of the collar defines a void.

4. The apparatus of claim 3, wherein the collar comprises a first edge and a second edge, the rotatable fastener threadedly rotated clockwise to advance the first edge and the second edge into increased proximity and decreasing a diameter of the void, and the rotatable fastener threadedly rotated counterclockwise to withdraw the first edge and the second edge into decreased proximity and increasing the diameter of the void.

5. The apparatus of claim 4, wherein the collar comprises a first segment and a second segment, the first segment terminating in the first edge, the second segment terminating in the second edge, and the first segment and the second segment mutually coupled at a position approximately opposite the first edge and the second edge.

6. The apparatus of claim 4, wherein the collar comprises a first segment and a second segment, the first segment terminating in the first edge, the second segment terminating in the second edge, and the first segment and the second segment mutually coupled via an articulable hinge at a position approximately opposite the first edge and the second edge.

7. An apparatus for anchoring an umbrella, the apparatus comprising:
   an adjustable, flexibly-resilient clamp, the clamp comprises a collar, a cam lever, and a radial compression adjustment device, wherein the collar comprises an internal perimeter, the internal perimeter of the collar positioned around and secured to an umbrella post via the cam lever, and wherein the radial compression adjustment device comprises a rotatable fastener threadedly adjustable through the collar and securing the cam lever in position;

at least one shock absorbing element disposed along the internal perimeter of the collar, wherein the at least one shock absorbing element comprises a flexible, resilient planar pad for absorbing and dampening forces imparted by the umbrella post and for improving frictional grip of the collar to the umbrella post; and an anchor assembly.

8. The apparatus of claim 7, wherein the anchor assembly comprises at least one aperture formed through the collar, and wherein the aperture receives and retains a guide line coupled with a weighted article.

9. The apparatus of claim 8, wherein the internal perimeter of the collar defines a void.

10. The apparatus of claim 9, wherein the collar comprises a first edge and a second edge, the rotatable fastener threadedly rotated clockwise to advance the first edge and the second edge into increased proximity and decreasing a diameter of the void, and the rotatable fastener threadedly rotated counterclockwise to withdraw the first edge and the second edge into decreased proximity and increasing the diameter of the void.

11. The apparatus of claim 10, wherein the collar comprises a first segment and a second segment, the first segment terminating in the first edge, the second segment terminating in the second edge, and the first segment and the second segment mutually coupled at a position approximately opposite the first edge and the second edge.

12. The apparatus of claim 10, wherein the collar comprises a first segment and a second segment, the first segment terminating in the first edge, the second segment terminating in the second edge, and the first segment and the second segment mutually coupled via an articulable hinge at a position approximately opposite the first edge and the second edge.

13. An apparatus for anchoring an umbrella, the apparatus comprising:

an adjustable, flexibly-resilient clamp, the clamp comprises a collar, a cam lever, and a radial compression adjustment device, wherein the collar comprises an internal perimeter, the internal perimeter of the collar that is positioned around and secured to an umbrella post via the cam lever, and wherein the radial compression adjustment device comprises a rotatable fastener threadedly adjustable through the collar and securing the cam lever in position;

at least one shock absorbing element disposed along the internal perimeter of the collar, wherein the at least one shock absorbing element comprises a flexible, resilient planar pad for absorbing and dampening forces imparted by the umbrella post and for improving frictional grip of the collar to the umbrella post; and an anchor assembly comprising a plurality of apertures formed in the collar, the plurality of apertures formed at intervals equidistant relative to the respective plurality of apertures, wherein each aperture receives and retains a guide line coupled with a weighted article.

14. The apparatus of claim 13, wherein the internal perimeter of the collar defines a void.

15. The apparatus of claim 14, wherein the collar comprises a first edge and a second edge, the rotatable fastener threadedly rotated clockwise to advance the first edge and the second edge into increased proximity and decreasing a diameter of the void, and the rotatable fastener threadedly rotated counterclockwise to withdraw the first edge and the second edge into decreased proximity and increasing the diameter of the void.

16. The apparatus of claim 15, wherein the collar comprises a first segment and a second segment, the first segment terminating in the first edge, the second segment terminating in the second edge, and the first segment and the second segment mutually coupled at a position approximately opposite the first edge and the second edge.

17. The apparatus of claim 15, wherein the collar comprises a first segment and a second segment, the first segment terminating in the first edge, the second segment terminating in the second edge, and the first segment and the second segment mutually coupled via an articulable hinge at a position approximately opposite the first edge and the second edge.

* * * * *